(12) United States Patent
Schweers et al.

(10) Patent No.: US 11,456,949 B1
(45) Date of Patent: Sep. 27, 2022

(54) ROUTING NETWORKS WITH ASYNCHRONOUS MESSAGE BACKUP AND REPLAY

(71) Applicant: QuickBase, Inc., Cambridge, MA (US)

(72) Inventors: Matthew F. Schweers, Medford, MA (US); John J. Fox, Ipswich, MA (US)

(73) Assignee: Quickbase, Inc., Boston, MA (US)

( * ) Notice: Subject to any disclaimer, the term of this patent is extended or adjusted under 35 U.S.C. 154(b) by 0 days.

(21) Appl. No.: 17/174,296

(22) Filed: Feb. 11, 2021

Related U.S. Application Data

(60) Provisional application No. 63/115,198, filed on Nov. 18, 2020.

(51) Int. Cl.
| | |
|---|---|
| *H04L 45/28* | (2022.01) |
| *H04L 45/42* | (2022.01) |
| *H04L 41/0604* | (2022.01) |
| *H04L 41/0654* | (2022.01) |
| *H04L 45/24* | (2022.01) |

(52) U.S. Cl.
CPC .......... *H04L 45/28* (2013.01); *H04L 41/0627* (2013.01); *H04L 41/0654* (2013.01); *H04L 45/24* (2013.01); *H04L 45/42* (2013.01)

(58) Field of Classification Search
CPC ..... H04L 1/189; H04L 1/1607; H04L 1/1671; H04L 1/1678; H04L 1/14; H04L 1/1803; H04L 1/1809; H04L 43/0847; H04L 43/0829; H04L 41/0627; H04L 41/0654; H04L 45/24; H04L 45/28; H04L 45/42
See application file for complete search history.

(56) References Cited

U.S. PATENT DOCUMENTS

| | | | |
|---|---|---|---|
| 5,705,443 A | 1/1998 | Stauf et al. | |
| 6,076,092 A | 6/2000 | Goldberg et al. | |
| 6,389,429 B1 | 5/2002 | Kane et al. | |
| 6,473,765 B1 | 10/2002 | Fink | |
| 6,725,235 B1 | 4/2004 | Dyer et al. | |
| 7,257,597 B1 | 8/2007 | Pryce et al. | |
| 7,490,073 B1 | 2/2009 | Qureshi et al. | |
| 7,512,061 B2 * | 3/2009 | Karlsson | H04L 12/4633 370/216 |
| 7,599,283 B1 * | 10/2009 | Varier | H04L 45/586 370/216 |
| 7,647,298 B2 | 1/2010 | Adya et al. | |
| 7,657,516 B2 | 2/2010 | Zaman et al. | |
| 8,335,772 B1 | 12/2012 | Ramesh et al. | |
| 8,407,255 B1 | 3/2013 | Srivastava et al. | |

(Continued)

OTHER PUBLICATIONS

Leila Ismail and Huned Materwala. "A Review of Blockchain Architecture and Consensus Protocols: Use Cases, Challenges, and Solutions", Sep. 24, 2019, 47 pages. (Year: 2019).*

(Continued)

*Primary Examiner* — George C Neurauter, Jr.
(74) *Attorney, Agent, or Firm* — Davis Malm D'Agostine, PC; David J. Powsner

(57) ABSTRACT

An improved digital data network of includes a plurality of routing nodes that are coupled for communications to form a routing network. The improvement comprises a message backup system that is coupled for communications with each of the plural routing nodes to store backup copies of digital messages and/or the digital data packets that make them up that are routed between those nodes.

6 Claims, 1 Drawing Sheet

(56) References Cited

U.S. PATENT DOCUMENTS

| | | | |
|---|---|---|---|
| 8,576,709 B2* | 11/2013 | Yang | H04L 43/0835 370/230 |
| 8,600,994 B1 | 12/2013 | Xu et al. | |
| 9,317,557 B2 | 4/2016 | Shao et al. | |
| 2003/0101035 A1 | 5/2003 | Gabele et al. | |
| 2004/0181538 A1 | 9/2004 | Lo et al. | |
| 2005/0154742 A1 | 7/2005 | Roth | |
| 2005/0160104 A1 | 7/2005 | Meera et al. | |
| 2005/0195818 A1* | 9/2005 | Hasegawa | H04L 12/1868 370/390 |
| 2006/0106832 A1 | 5/2006 | Ben-Dyke et al. | |
| 2006/0168241 A1* | 7/2006 | Puthiyandyil | H04L 69/22 709/227 |
| 2007/0050323 A1 | 3/2007 | Dettinger et al. | |
| 2007/0162274 A1 | 7/2007 | Ruiz et al. | |
| 2007/0226203 A1 | 9/2007 | Adya et al. | |
| 2007/0230361 A1* | 10/2007 | Choudhury | H04L 43/00 370/250 |
| 2008/0279181 A1* | 11/2008 | Shake | H04L 1/08 370/389 |
| 2010/0169380 A1 | 7/2010 | Miller et al. | |
| 2011/0307501 A1 | 12/2011 | Terwilliger et al. | |
| 2011/0317700 A1* | 12/2011 | Assarpour | H04L 45/54 370/392 |
| 2012/0246179 A1 | 9/2012 | Garza et al. | |
| 2017/0032005 A1* | 2/2017 | Zheng | G06F 16/128 |
| 2017/0344435 A1* | 11/2017 | Davis | G06F 16/9535 |
| 2017/0344987 A1* | 11/2017 | Davis | G06F 16/2255 |
| 2018/0189397 A1 | 7/2018 | Norman | |
| 2018/0260212 A1* | 9/2018 | Wisnovsky | G06F 8/71 |
| 2018/0262420 A1* | 9/2018 | Jaffer | H04L 45/24 |
| 2019/0138401 A1* | 5/2019 | Davis | H04L 9/3239 |
| 2019/0139043 A1* | 5/2019 | Davis | G06F 16/2255 |
| 2021/0018953 A1* | 1/2021 | Ford | G06F 1/14 |

OTHER PUBLICATIONS

Du Mingxiao et al. "A Review on Consensus Algorithm of Blockchain", 2017 IEEE International Conference on Systems, Man, and Cybernetics (SMC), Banff Center, Banff, Canada, Oct. 5-8, 2017, 6 pages. (Year: 2017).*

Yang Xiao et al. "A Survey of Distributed Consensus Protocols for Blockchain Networks", IEEE Communications Surveys and Tutorials, vol. 22, No. 2, Second Quarter 2020, 34 pages. (Year: 2020).*

Elli Androulaki et al. "Hyperledger Fabric: A Distributed Operating System for Permissioned Blockchains", EuroSys '18, Apr. 23-26, 2018, Porto, Portugal, 15 pages. (Year: 2018).*

U.S. Appl. No. 10/307,501, filed Jun. 4, 2019, Dayton.

* cited by examiner

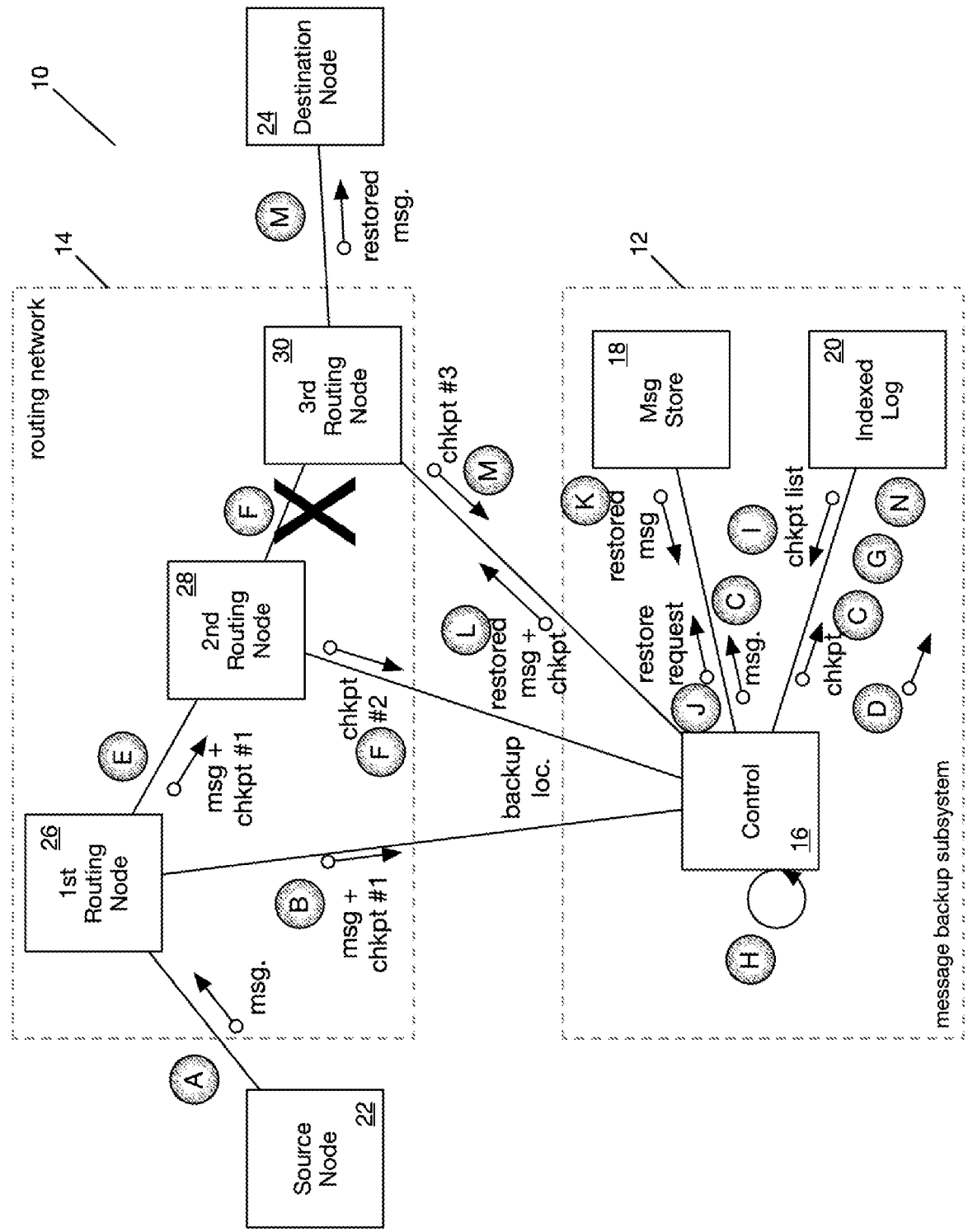

ROUTING NETWORKS WITH ASYNCHRONOUS MESSAGE BACKUP AND REPLAY

This application claims the benefit of priority of U.S. Patent Application Ser. No. 63/115,198, filed Nov. 18, 2020, and entitled ASYNCHRONOUS MESSAGE BACKUP & REPLAY, the teachings of which are incorporated herein by reference.

BACKGROUND OF THE INVENTION

The invention pertains to digital data networking and, more particularly, to networks for transmitting digital data messages between and among network nodes. The invention has application in improving the reliability of such networks in the face of message loss.

Though laypeople typically think of digital data networks as simple cables that carry information directly between client and server computers, the actual architecture is considerably more complex. Networks are usually comprised of multiple interconnected nodes that can be enlisted in varying sequences and at varying times to carry information-containing data packets and the messages that they form over varying paths from sources (e.g., client computers) to destinations (e.g., server computers) and vice versa. This is out of necessity and convenience. Necessity, for example, in the sense that nodes and the paths between them can break or become overburdened, necessitating the use of alternate nodes and paths from source to destination. Convenience, for example, in the sense that sources and destinations can, themselves, take roles as nodes in routing packets and/or messages between still other nodes of the network.

Such networks (or "routing networks" as they are sometimes referred to hereinafter) exist at many levels, for example, within the home or enterprise, within a campus or other geographic region, and at a national/public level, such as the Internet—all, by way of example. Moreover, they can be (and, indeed, typically are) interconnected, e.g., by gateways or the like.

It is as a result of this complexity, whether at the node level, the network level and/or the interconnection therebetween, that digital data packets or messages are sometimes lost. Messaging protocols have been developed to accommodate this, typically, through packet retransmission—although, some protocols do not provide this capability, and even among those that do, protocol-level solutions are far from ideal.

An object of the invention is to provide improved methods and apparatus for digital data networking.

A further object is to provide such methods and apparatus for digital data networking as improve the transmission of digital packets and/or messages between and among nodes from sources to destinations.

A still further object of the invention is to provide such methods and apparatus as improve the reliability of digital data networks in the face of message loss.

SUMMARY OF THE INVENTION

The foregoing are among the objects attained by the invention, which provides in some aspects an improved digital data network of the type that includes a plurality of routing nodes that are coupled for communications to form a routing network. The improvement comprises a message backup system that is coupled for communications with each of the plural routing nodes to store backup copies of digital messages—and/or the digital data packets that make them up—that are routed between those nodes. Such messages and/or their constituent packets are collectively referred to herein after as "messages," except where otherwise evident from context.

Related aspects of the invention provide an improved digital data network, e.g., as described above, in which the message backup system selectively restores a backup copy of a message and returns it to one of the routing nodes.

Further related aspects of the invention provide an improved digital data network e.g., as described above, in which the message backup system detects that a message routed from a first of the routing nodes was never received by a second of the routing nodes.

Still further related aspects of the invention provide an improved digital data network, e.g., as described above, in which the message backup system responds to detection of a message that was routed from a first of the routing nodes and never received by a second of those nodes by restoring a backup copy of that message and returning it to the first of the routing nodes.

Other aspects of the invention provide an improved digital data network, e.g., as described above, in which at least a first of the routing nodes forwards to the message backup system a backup copy of a message that the first routing node is concurrently routing to a second of the routing nodes.

Related aspects of the invention provide an improved digital data network, e.g., as described above, in which the first routing node modifies a header of the message prior to routing it to the second routing node, where the first routing node modifies the header to include checkpoint metadata.

Further related aspects of the invention provide an improved digital data network, e.g., as described above, in which the checkpoint metadata includes at least an ID of the first routing node and a timestamp.

Still further related aspects of the invention provide an improved digital data network, e.g., as described above, in which the checkpoint metadata additionally includes a unique message ID and a location of the backup copy of the message in the message backup system.

Yet still further aspects of the invention provide an improved digital data network, e.g., as described above, in which the routing nodes and the message backup system are part of a common network—or, put another way, they reside behind a common gateway that separates them from other networks.

Other aspects of the invention provide methods of operating a digital data network paralleling the digital data network described above.

Still further aspects of the invention are evident in the text that follows and in the drawings.

BRIEF DESCRIPTION OF THE DRAWINGS

A more complete understanding of the invention may be attained by reference to the drawings, in which FIG. 1 depicts a digital data processing system including a routing network and a message backup system according to the invention.

DETAILED DESCRIPTION OF THE ILLUSTRATED EMBODIMENT

The architecture of a networked digital data processing system 10 utilizing a message backup system (MBS) 12 according to the invention is depicted in FIG. 1.

The system 12 includes a routing network 14 of the conventional type known in the art as adapted to effect the operations described below—to wit, to cooperate with MBS 12 to backup and replay messages routed by the network 14 between source and destination. For the most part that adaptation involves implementing proxy code on the otherwise-standard routing nodes 26, 28, 30 (e.g., gateways and mesne routing nodes) that make up the network 14 to make them aware of the MBS 12. Though only three nodes 26, 28, 30 are shown in network 14, in practice, it is likely to contain many more such nodes.

The MBS 12, itself, comprises a control section 16, a message store 18 and an indexed log 20 interconnected as shown in the drawing. Control section 16 is a digital data device (ranging from a CPU on a multi-tasked computer to a dedicated server) executing code suitable for effecting (along with the aforesaid proxies) the operations described below. Message store 18 comprises a dedicated, networked or other store suitable for retaining copies of messages routed by network 14. Indexed log 20 likewise comprises a dedicated, networked or other store, albeit, adapted for maintaining a log of checkpoint information (described below) in indexed fashion for rapid searching and retrieval.

The MBS 12 and routing network 14 cooperate to effect (i.e., cause) the following operations vis-a-vis a message ("msg") launched by a source 22 and routed towards a destination 24 by the network 14. Those operations can be executed asynchronously with respect to the regular routing operations of the network 14, e.g., vis-à-vis transferring messages from the source 22 the destination 24. The source and destination nodes 22, 24 comprise conventional apps, processes, etc., executing on conventional digital data devices of the variety known in the art. Source 22 and destination 24 need not be MBS-aware.

Described below is an exemplary use case of the system 10 for in which a message ("msg") that is being routed from the source 22 to the destination 24 is lost mid-stream within the routing network and subsequently recovered (or "replayed") through cooperation of the network 14 and the MBS 12:

Step A: Source 22 launches msg in the conventional manner known in the art. Msg includes a header or other metadata of the type known in the art identifying node 24 as the destination.

Step B: a 1st routing node 26 receives msg directly or indirectly (via nodes external to routing network 14) as per convention in the art and forwards a backup copy of it, along with partial checkpoint information (to wit, message GUIID, routing node ID, and timestamp) to MBS 12.

Step C: control unit 16 of MBS 12 stores away the backup copy of msg to message store 18 and stores the checkpoint info to indexed log 20. Though not illustrated here, store 18 can logically include storage layers provided within and/or between the routing nodes 26, 28, 30.

Step D: control unit 16 logs the storage location of the backup copy of msg in store 18 to the indexed log 20 for use in completing checkpoint info. In some embodiments, that storage location is also returned to the routing node 26 for inclusion in headers of msg.

Step E: routing node 26 sends msg, along with a header containing completed checkpoint info (message GUIID, routing node ID, timestamp and backup message location) to an intermediate routing node 28. Other than inclusion of that checkpoint info in msg's header, routing of msg in this regard is per convention in the art.

Step F: routing node 28 sends msg on to a final routing node 30, along with an updated checkpoint header (now, including the ID of the mesne routing node 28). Other than inclusion of that checkpoint info in msg's header, routing of msg in this regard is per convention in the art. At the same time, routing node 28 sends updated checkpoint info to MBS 12. As indicated by an "X" in the drawing, msg is lost during transmission to node 30.

Step G: updated checkpoint info from node 28 is logged by MBS 12 to log 20.

Step H: sometime later, control unit 16 initiates a routine maintenance check of the indexed log 20.

Step I: for purposes of the maintenance check, the indexed log 20 sends full or filtered list of log messages to control unit 16

Step J: upon detecting that msg never made it to node 30 (i.e., as evidenced by the absence of a log message from that node 30 within expected time period), control 16 requests the backup (or "restore") copy of msg from store 18.

Step K: restored msg returned from store 18 to control unit 16.

Step L: restored msg+checkpoint info is sent to routing node 30 so that it can complete the journey Step M: routing node 30 sends restored msg to destination node 24 (directly or indirectly, e.g., through intermediate nodes external to network 24) and, simultaneously, sends checkpoint info to MBS for logging (in Step N).

Described above is a networked digital data processing system 10 utilizing a message backup system according to some practices of the invention. It will be appreciated that the illustrated embodiment shows but one embodiment of the invention and that other embodiments incorporating changes therein fall within the scope of the invention.

What is claimed is:

1. In a digital data network of the type that includes a plurality of routing nodes that are coupled for communications to form a routing network that routes a digital message from a source to a destination, the improvement wherein the routing network comprises:

A. a message backup system that is coupled for communications with each of the plural routing nodes to store backup copies of digital messages routed between those nodes, B. a first routing node that is part of the routing network and that receives a digital message directly or indirectly from a source for routing to a destination outside the routing network, where the digital message includes a header identifying the destination, the first routing node (i) sending a backup copy of the received digital message to the message backup system, (ii) modifying the message to include checkpoint metadata that includes an ID of the first routing node and that includes a location of the backup copy of the digital message in the message backup system, and (iii) sending the modified, received digital message to a second routing node that is part of the routing network along with checkpoint metadata, C. the message backup system (i) storing the backup copy of the digital message received from the first routing node, (ii) selectively restoring that backup copy upon detecting that the digital message sent from the first routing node was not received by the second routing node and (iii) sending the restored digital message to the second routing node, D. the second routing node receiving the returned backup copy of the digital message and routing that copy of the digital message directly or indirectly to the destination outside the routing network identified in the header of that copy of the digital message, and sending checkpoint metadata to the message backup system in connection therewith.

2. In the digital data network of claim 1, the further improvement wherein the checkpoint metadata additionally includes a unique message ID.

3. A method of operating a digital data network of the type that includes a plurality of routing nodes that are coupled for communications to form a routing network that routes a digital message from a source to a destination, the method comprising:

A. receiving a digital message with a first routing node that is part of the routing network, where the digital message is received directly or indirectly from a source for routing to a destination outside the routing network, where the digital message includes a header identifying the destination, B. with the first routing node, (i) sending a backup copy of the received digital message to a message backup system that is coupled to the routing nodes that make up the routing network, (ii) modifying the header of the message, prior to routing it to the second routing node, to include checkpoint metadata that includes an ID of the first routing node and that includes a location of the backup copy of the digital message in the message backup system, and (iii) sending the received digital message along with the modified header to a second routing node that is part of the routing network along with the checkpoint metadata, C. with the message backup system, storing the backup copy of the digital message received from the first routing node, D. with the message backup system, selectively restoring said backup copy and returning it to the second routing node, and E. with the second routing node, routing the returned backup copy of the digital message directly or indirectly to the destination outside the routing network identified in the header of that copy of the digital message.

4. The method of claim 3, wherein step (D) includes selecting restoring said backup copy upon detecting that a message routed from the first routing node was never received by the second routing node.

5. The method of claim 3, wherein the checkpoint metadata includes a timestamp.

6. The method of claim 5, wherein the checkpoint metadata additionally includes a unique message ID.

* * * * *